(12) United States Patent
Dahlke et al.

(10) Patent No.: US 8,695,989 B2
(45) Date of Patent: Apr. 15, 2014

(54) HOT GAS SEAL

(75) Inventors: Stefan Dahlke, Bechen (DE); Jesse Eng, Jupiter, FL (US); John Carl Glessner, Oviedo, FL (US); Daniel Hofmann, Orlando, FL (US); Roland Liebe, Monheim (DE); Kenneth Michael Tamaddoni-Jahromi, Orlando, FL (US)

(73) Assignee: Siemens Aktiengesellschaft, München (DE)

( * ) Notice: Subject to any disclaimer, the term of this patent is extended or adjusted under 35 U.S.C. 154(b) by 2103 days.

(21) Appl. No.: 10/837,006

(22) Filed: Apr. 30, 2004

(65) Prior Publication Data

US 2005/0242525 A1    Nov. 3, 2005

(51) Int. Cl.
*F16J 15/02* (2006.01)

(52) U.S. Cl.
USPC ........................................... 277/644

(58) Field of Classification Search
USPC .......... 277/583, 605, 630, 637, 644, 645, 650
See application file for complete search history.

(56) References Cited

U.S. PATENT DOCUMENTS

| | | | | |
|---|---|---|---|---|
| 3,802,961 A * | 4/1974 | Grass et al. | ................... | 162/371 |
| 4,058,435 A * | 11/1977 | Williams, Jr. | ................. | 162/371 |
| 4,300,775 A * | 11/1981 | Ringel | .......................... | 277/589 |
| 6,123,746 A | 9/2000 | Alvin | | |
| 6,161,834 A * | 12/2000 | Pollack et al. | ................ | 277/300 |
| 6,592,721 B1 * | 7/2003 | Anderson et al. | ............. | 162/274 |
| 6,733,234 B2 * | 5/2004 | Paprotna et al. | ............. | 415/138 |
| 6,840,047 B2 * | 1/2005 | Schmahl et al. | ................ | 60/753 |
| 6,854,736 B2 * | 2/2005 | Paprotna | ....................... | 277/413 |
| 6,948,715 B2 * | 9/2005 | Taylor et al. | .................. | 277/603 |
| 7,090,224 B2 * | 8/2006 | Iguchi et al. | .................. | 277/603 |
| 7,147,230 B2 * | 12/2006 | Rowe | .............................. | 277/583 |
| 7,152,864 B2 * | 12/2006 | Amos et al. | ..................... | 277/650 |
| 2003/0079475 A1 | 5/2003 | Schmahl et al. | | |
| 2004/0017047 A1 | 1/2004 | Baker | | |

FOREIGN PATENT DOCUMENTS

| | | |
|---|---|---|
| EP | 1022437 A1 | 7/2000 |
| EP | 1260767 A1 | 11/2002 |
| EP | 1 302 723 A1 | 4/2003 |
| EP | 1310735 A1 | 5/2003 |
| EP | 1378690 A2 | 1/2004 |
| EP | 1398568 A2 | 3/2004 |
| EP | 1398569 A1 | 3/2004 |
| GB | 2219355 A | 12/1989 |

\* cited by examiner

*Primary Examiner* — Vishal Patel (57) ABSTRACT

An inventive hot gas seal for sealing an opening, e.g. a gap or hole, in a heat shield element or between heat shield elements of a heat shield or a liner comprises at least one resilient portion for providing a force which is designed such that the hot gas seal can be held in said opening by said force and/or that the sealing efficiency of the hot gas seal is increased by said force. Thus, further means for holding the seal in place and/or for increasing the sealing efficiency are not necessary. The invention is particularly useful if the design of said resilient portion is such that the force provides a holding action and increases the sealing efficiency, at the same time.

3 Claims, 6 Drawing Sheets

HOT GAS SEAL

FIELD OF THE INVENTION

The present invention relates to a hot gas seal and a hot gas seal assembly.

BACKGROUND OF THE INVENTION

Walls of high temperature gas reactors, e.g. the walls of turbine combustion chambers, need to be shielded by a suitable thermal shielding against attack of the hot gas. The thermal shielding can be achieved by providing a hot gas resistant liner, which usually comprises a number of shield elements covering a wall to be shielded. The heat shield elements can e.g. be implemented in form of ceramic heat shield elements (CHS elements) or in form of suitable metallic heat shield elements. To allow for thermal expansion when being exposed to the hot gas, the heat shield elements are arranged such that gaps are left between neighboring heat shield elements. In order to prevent hot gas from passing through these gaps from the hot gas side of a heat shield, e.g. to a carrier structure to which the heat shield elements are fixed, gaps would need purging with air to avoid overheating. This air is costly leakage.

In EP 1 302 723 A1 it is proposed to seal gaps between heat shield elements with sealing elements to prevent hot gas from passing the gaps.

SUMMARY OF THE INVENTION

It is an object of the present invention to provide an improved hot gas seal.

It is a further object of the present invention to provide an improved hot gas seal assembly.

The first object is solved by a hot gas seal as claimed in claim 1, the second object is solved by a hot gas seal assembly as claimed in claim 28.

An inventive hot gas seal for sealing an opening, e.g. a gap or hole, in a heat shield element or between heat shield elements of a heat shield or a liner comprises at least one resilient portion for providing a force which is designed such that the hot gas seal can be held in said opening by said force and/or that the sealing efficiency of the hot gas seal is increased by said force. Thus, further means for holding the seal in place and/or for increasing the sealing efficiency are not necessary. The invention is particularly useful if the design of said resilient portion is such that the force provides a holding action and increases the sealing efficiency, at the same time.

In a first embodiment of the inventive hot gas seal, the at least one resilient portion may form a leg portion of a clamp. Preferably, two resilient portions are provided, each forming a leg portion of a clamp.

In a second embodiment of the inventive hot gas seal, at least two leg portions are provided which are linked by a resilient bracket portion which forms said at least one resilient portion for providing said force. The leg portions do therefore not necessarily need to be resilient themselves. In a further development of this embodiment, the resilient bracket portion is pre-tensioned for providing said force. The pre-tension may be chosen such that the leg portions tend to open or, alternatively, such that the leg portions tend to close. The pretension can be used to assure a secure fixing of the hot gas seal to a liner and/or to provide a tight sealing by pressing the leg portions against a wall of a liner.

In a third embodiment, a metallic sealing plate comprising at least one corrugated portion is provided. The at least one corrugated portion forms said at least one resilient portion for providing said force.

In a fourth embodiment, the hot gas seal comprises at least one spring like portion which forms said at least one resilient portion for providing said force. By setting the spring parameters of the spring like portion, it is possible to adjust the force provided by the spring like portion.

In a fifth embodiment, the hot gas seal comprises a tubular sealing body which comprises a resilient core which forms said at least one resilient portion for providing said force. The resilient core may comprise a spring element which may, e.g., have a spiral shaped cross section, a cross section which has the shape of an elliptical spiral, or an omega shaped cross section. As an alternative to forming the resilient core by a spring element, it is possible to provide at least one gas tight and gas filled space inside of the tubular sealing body. The gas filled space forms the resilient core of the tubular sealing body, i.e. the sealing body acts similar to a gas spring. The spring force provided by the gas depends on the gas temperature and the gas pressure inside the gas tight space at a reference temperature. By suitably setting the gas pressure at the reference temperature, the resilient properties of the seal may be set.

In a sixth embodiment, the hot gas seal comprises a flexible rolled sheet which forms said at least one resilient portion for providing said force. The flexible rolled sheet may have a sandwich structure comprising a soft, compliant or flexible surface on a flexible material. In a further development of the fifth embodiment, the cross section of said flexible rolled sheet may resemble the shape of an elliptical spiral.

In a seventh embodiment, the hot gas seal comprises a body and a number of resilient extensions extending from the body. In the seventh embodiment, the extensions form said at least one resilient portion for providing said force. The body may have a planar shape. The extensions then protrude from at least one side of the planar shaped body. As an alternative, the body may have a circular or elliptical cross section. The extensions then protrude radially from the body. The extensions may e.g. have a bristle like shape, a wedge like shape, a coil like shape, or a serpentine like shape. Preferably, the body and/or the extensions are surrounded by a cloth seal.

In the inventive hot gas seal, said at least one resilient portion is preferably pre-tensioned for providing said force.

An inventive hot gas seal assembly for sealing an opening, e.g. a gap or a hole, in a heat shield element or between heat shield elements of a heat shield or liner against a hot gas, comprises a sealing body and at least one further sealing element which is in a solid state at room temperature and in a high viscosity liquid state at the temperature of the hot gas. During installation of the hot gas seal assembly, the further sealing element is solid. During operation of the heat shielded structure, i.e. when hot gas is present, the further sealing element melts, and the inventive sealing assembly provides a tight seal of the opening.

Further features, properties, and advantages of the present invention are described hereinafter with reference to the accompanying drawings, by means of detailed embodiments.

DETAILED DESCRIPTION OF THE INVENTION

Figure 1:
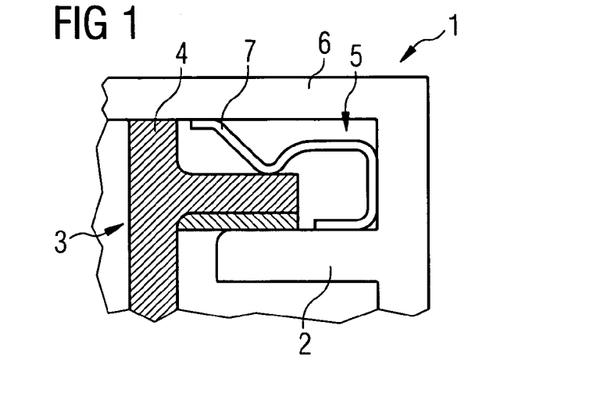
FIG. 1 shows a first example of a first embodiment of the inventive hot gas seal.

A first embodiment of the present hot gas seal will now be described with reference to FIGS. 1-4. The first example of the first embodiment of the inventive hot gas seal is shown in FIG. 1. The figure shows a first heat shield element 1, a second heat shield element 3, and a hot gas seal 5. Each heat shield element 1, 3 comprises a projection 2, 4 which projects towards the respective other heat shield element 1, 3. The heat shield elements 1, 3 are arranged such that the projections 2, 4 are located adjacent to each other. The first heat shield element 1 further comprises a wall portion 6 which forms, together with the respective projection 2, a space for accommodating therein the hot gas seal 5, and for receiving the projection 4 of the second heat shield element 3. When the hot gas seal 5 is accommodated in the opening, a resilient leg portion 7 is clamped between the projection 4 of the second heat shield element 3 and the wall portion 6 of the first heat shield element 1. Thus, the leg portion 7 exerts, by means of a spring force, a pressure to the projection 4 which presses this projection 4 onto the projection 2 of the first heat shield element 1.

Figure 2:
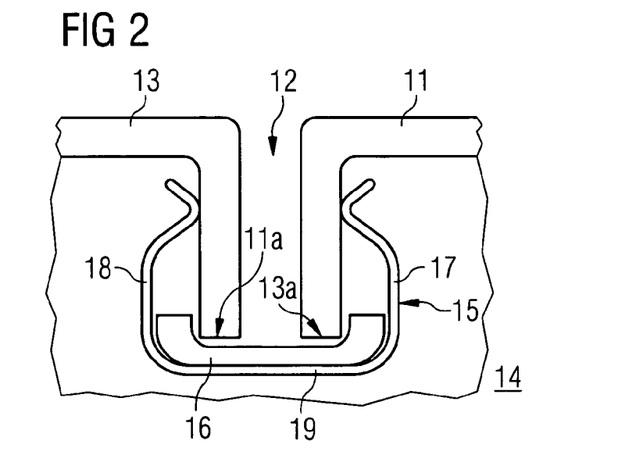
FIG. 2 shows a second example of the first embodiment of the inventive hot gas seal.

A second example of the first embodiment is shown in FIG. 2. Like FIG. 1, FIG. 2 shows a first heat shield element 11, a second heat shield element 13, and a hot gas shield 15. The first heat shield element 11 and the second heat shield element 13 are arranged such that a gap 12 is left between them. The hot gas seal 15 comprises two leg portions 17, 18 and a sealing portion 19 linking both leg portions 17, 18. The leg portions 17, 18 are resilient and provide a spring force urging the leg portions 17, 18 towards the heat shield elements 11, 13. By said spring force, the hot gas seal 15 is held in place to seal the gap 12. The sealing portion 19 can be shielded against the hot gas by an additional shield element 16 arranged between the sealing portion 19 and the end faces 11a, 13a of the shield elements 11, 13 such that the sealing portion 19 and the leg portions 17, 18 are protected against the hot gas. The hot gas seal 15, in particular the sealing portion 19 of the hot gas seal 15, may be fixed, e.g. screwed, to a carrier structure 14 carrying the heat shield elements 11, 13. In this example, the hot gas seal 15 is located completely under the heat shield elements 11, 13 so that it is well protected against the hot gas.

Figure 3:
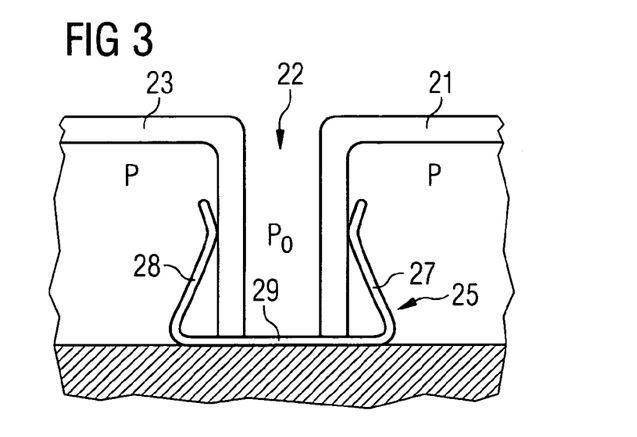
FIG. 3 shows a third example of the first embodiment of the inventive hot gas seal.

A third example of the first embodiment is shown in FIG. 3. The hot gas seal 25 of FIG. 3 is very similar to the hot gas seal 15 shown in FIG. 2. It comprises a first resilient leg portion 27, a second resilient leg portion 28, and a sealing portion 29 linking both leg portions 27, 28. Like the hot gas seal 15 in FIG. 2, the hot gas seal 25 seals a gap 22 between two heat shield elements 21, 23. Across the hot gas seal 25, a pressure gradient is build up to increase the sealing pressure pressing each leg portion 27, 28 against the respective heat shield element 21, 23. To achieve this, the pressure p acting on the leg portions 27, 28 for pressing them towards the heat shield elements 21, 23 is set to be higher than the pressure $p_0$ of the hot gas the gap 22 between the heat shield elements 21, 23.

Figure 4:
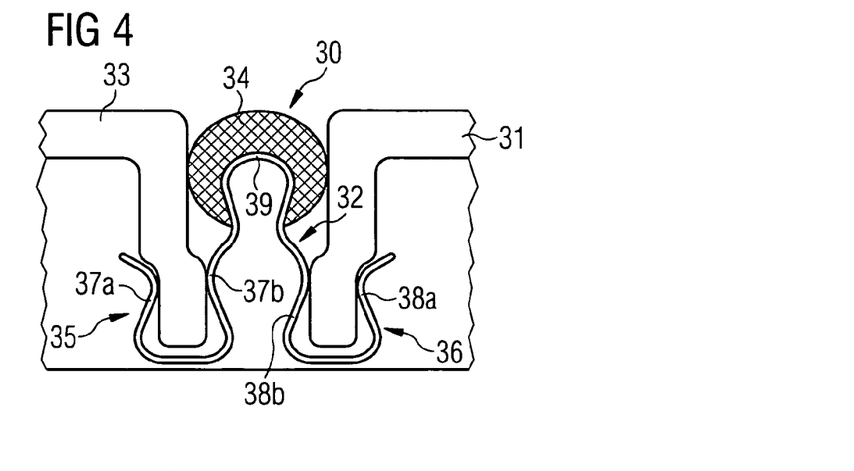
FIG. 4 shows a fourth example of the first embodiment of the inventive hot gas seal.

A fourth example of the first embodiment of the inventive hot gas seal is shown in FIG. 4. The hot gas seal 30 comprises a first holding portion 35 and a second holding portion 36. The holding portions 35, 36 are linked by a sealing portion 39. The sealing portion 39 forms a loop projecting into a gap 32 between two heat shield elements 31, 33. The section of the sealing portion 39 which projects furthest into gap 32 is surrounded by a shielding material 34 to provide a shielding from the high temperatures of the hot gas. Suitable shielding materials are ceramic materials or metallic materials, e.g. ceramic or metallic cloths.

The holding portions 35, 36 each comprise a leg portion 37a, 38a, which can be used together with central sections 37b, 38b of the hot gas sealing portion 39 to clamp the hot gas seal 35 to the heat shield elements 31, 33. The sealing is provided by a pre-tension of the hot gas seal, e.g. by a pre-tension of the leg sections 37a, 37b and/or the central sections 38a, 38b.

Figure 5:
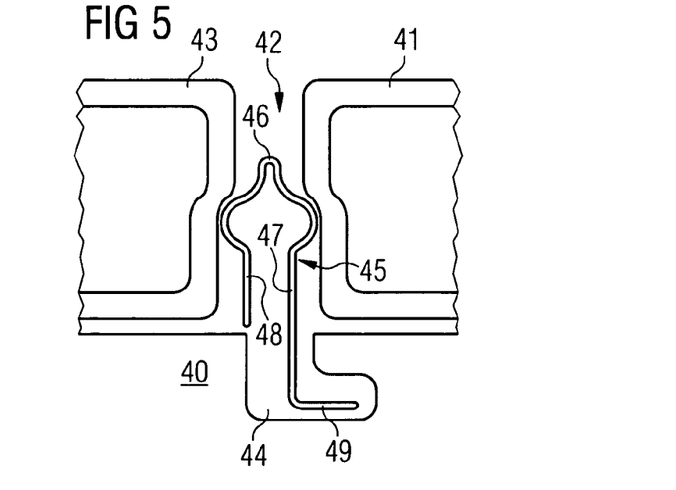
FIG. 5 shows a first example of a second embodiment of the inventive hot gas seal.

The first sample of the second embodiment is shown in FIG. 5. The Figure shows a first heat shield element 41 and a second heat shield element 43 between which a gap 42 is formed. The gap 42 is sealed by a hot gas seal 45 which comprises a first leg portion 47 and a second leg portion 48. Both leg portions 47, 48 are linked by a resilient bracket portion 46 which is pre-tensioned such that the leg portions 47, 48 tend to open. When being inserted into the gap 42, therefore, the legs 47, 48 are urged against the walls of the heat shield elements 41, 43 for providing the sealing action. In order to secure the hot gas seal 45 against loss, the leg portion 47 is longer than the leg portion 48 and comprises a holding section 49 by which it is fixed in a recess 44 of a carrier structure 40 for carrying the heat shield elements 41, 43.

Figure 6:
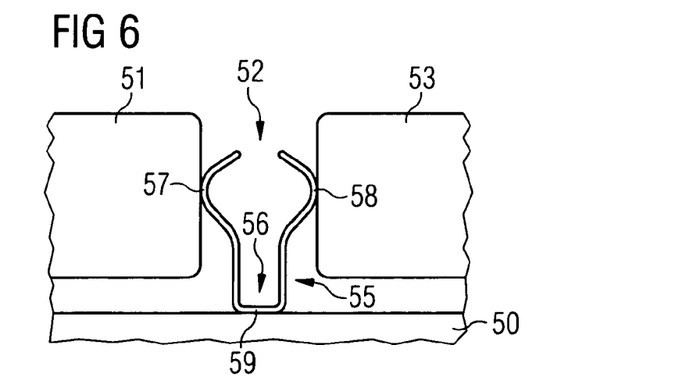
FIG. 6 shows a second example of the second embodiment of the inventive hot gas seal.

A second example of the hot gas seal according to the second embodiment is shown in FIG. 6. Like the seal 45 in FIG. 5, the seal 55 in FIG. 6 is arranged in a gap 52 between two heat shield elements 51, 53. The hot gas seal 55 comprises a first leg portion 57 and a second leg portion 58, which are linked by a pre-tensioned bracket portion 56. The pre-tension, like in the example shown in FIG. 5, is such that the legs 57, 58 tend to open. The sealing action is provided by the spring force which is exerted by the bracket portion 56 and transmitted to the surfaces of the heat shield elements 51, 53 through the leg portions 57, 58. Further, the hot gas seal 55 comprises a fixing section 59, which allows the hot gas seal 55 to be fixed e.g. screwed, to carrier structure 50 for carrying the heat shield elements 51, 53.

Figure 7:
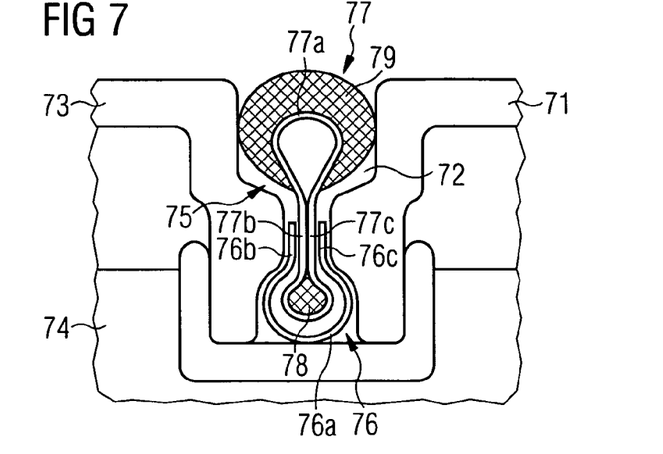
FIG. 7 shows a third example of the second embodiment of the inventive hot gas seal.

A third example of the second embodiment is shown in FIG. 7. In FIG. 7, a first heat shield element 71, a second heat shield element 73, and a third heat shield element 74 are shown. In a gap 72 between the first heat shield element 71 and the second heat shield element 73, a hot gas seal 75 is disposed. The hot gas seal 75 according to the third example of the second embodiment comprises two parts, a holding part 76 and a shielding part 77. In FIG. 7, both parts are shown in cross section. They extend through a major part of the gap 72 in a direction perpendicular to the cross section.

The shielding part 77 of the hot gas seal 75 is made of a bent metal sheet which is bent such that the center section 77a of the metal sheet forms a closed loop in cross section and that the peripheral sections 77b, 77c of the metal sheet are folded back onto each other. The folded back peripheral sections 77b, 77c are fixed to a rod 78 which extends through a major part of the gap 72 in a direction perpendicular to the cross section.

The holding part 76 of the hot gas seal is also made of a bent metal sheet. The metal sheet is bent such that the central section 76a of it forms a loop and that its peripheral sections 76b, 76c are substantially parallel to each other with leaving a gap there between. The central section 76a of the holding part 76 is pre-tensioned such that the peripheral sections 76b, 76c tend to open.

When the hot gas seal 75 is placed in the gap 72 between the heat shield elements 72 and 73, the peripheral sections 77b, 77c of the shielding part 77 are inserted into the holding part 76 such that the rod 78 extends through the tubular space formed by the central section 76a of the holding part 76. Then, the holding part 76 is inserted into the gap 72 while pressing the peripheral sections 76b, 76c against the pre-tension together, thereby fixing the shielding part 77 in the holding part 76. After being inserted into the gap 72, an opening movement of the peripheral sections 7ab, 76c of the holding part 76 due to the pre-tension is restricted by the heat shield elements 71, 73. Therefore, the spring force provided by the central section 76a of the holding part 76 provides for a tight sealing of the gap 72. In the example shown in FIG. 7, a ceramic or metallic hot gas part 79 that provides shielding from the high temperatures of the hot gas is provided around the central section 77a of the shielding part 77.

Figure 8:
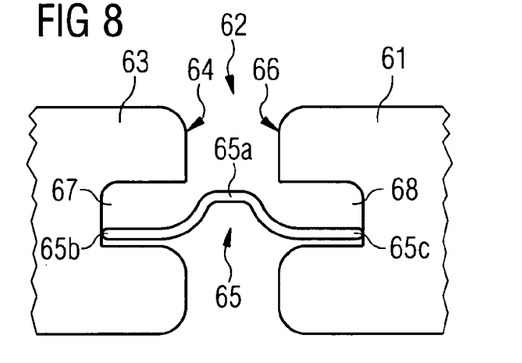
FIG. 8 shows an example of a third embodiment of the inventive hot gas seal.

An example of the third embodiment is shown in FIG. 8. The heat shield elements 61, 63 shown in FIG. 8 comprise front surfaces 64, 66 which face each other. Between the front surfaces 64, 66 a gap 62 is formed. Further, recesses 67, 68 are formed in each front surface 64, 66. The hot gas seal 65 has a plate like shape which, in FIG. 8, is shown in cross-section. Its center section 65a is corrugated, while its outer sections 65b, 65c are substantially flat. When being disposed in the gap 62 between the heat shield elements 61, 63, the outer sections 65b, 65c are placed in the recesses 67, 68. The corrugated center section 65a then urges the outer sections 65b, 65c away from each other. Thus, it presses the outer sections 65b, 65c into the recesses 67, 68 and, as a consequence, provides a holding and sealing action.

Figure 9:
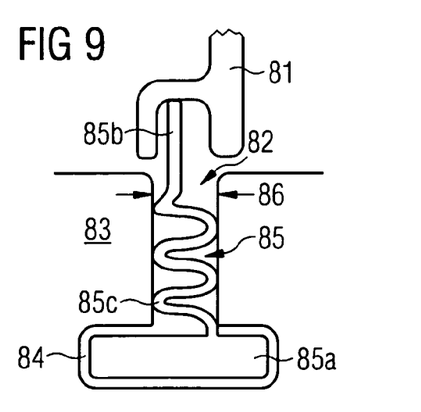
FIG. 9 shows an example of a fourth embodiment of the inventive hot gas seal.

An example of the fourth embodiment of the inventive hot gas seal is shown in FIG. 9. The figure shows a heat shield element 81 and a carrier structure 83 in which a notch 82 is formed. Between a bottom section 84 and an opening of the notch 82, a narrow section 86 of the notch 82 is formed. A hot gas seal 85 is provided in the notch. The hot gas seal 85 comprises a plate like portion 85a which extends through the bottom section 84 of the notch 82, a sheet like portion 85b which protrudes from the notch 82 in the direction of the heat shield element 81, and a spring like portion 85c linking the plate like portion 85a and the sheet like portion 85b.

The spring like portion 85c is made from a spring loaded metal. It allows for thermal movement of the heat shield element 81 while still maintaining the sealing. Although the spring like portion 85c is, in the example shown in FIG. 9, formed integrally with the hot gas seal 85 it may as well be a separate part.

The plate like portion 85a of the hot gas seal 85 is captured in the bottom part 84 of the notch 82, thus holding the hot gas seal 85 in place. This way of holding the hot gas seal 85 in place provides the advantage of increased serviceability.

Figure 10:
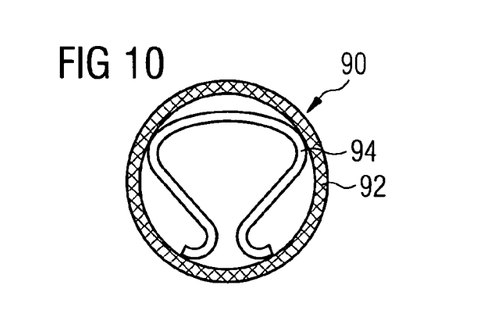
FIG. 10 shows a first example of a fifth embodiment of the inventive hot gas seal.

A first example of the fifth embodiment of the inventive hot gas seal is shown in FIG. 10. The hot gas seal 90 is made from a tubular cloth 92 which increases the sealing efficiency by providing a soft, compliant or flexible surface which can be pressed against e.g. walls of heat shield elements. The cloth 92 may be made from a suitable ceramic, metallic, or other material which can be exposed to the hot gas. Inside of tubular cloth 92, an omega shaped spring 94 is arranged which provides a spring force for pressing the outer surface of the tubular cloth 92 e.g. towards the walls of heat shield elements. The omega-shaped spring 94 is preferably made of metal. As an alternative, an E-shaped spring may be used instead of the omega shaped spring, as well.

Figure 11:
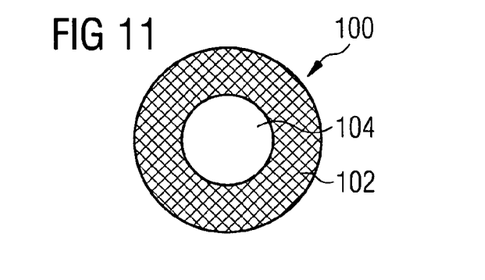
FIG. 11 shows a second example of the fifth embodiment of the inventive hot gas seal.

A second example of the fifth embodiment is shown in FIG. 11. Like in the first example, the hot gas seal 100 comprises a tubular cloth 102. In the present example, the interior of the tubular cloth 102 forms a gas tight and gas filled interior space 104. The gas tight sealing of the interior space 104 of the tubular cloth 102 may be provided by a suitable coating of its inner wall. When the hot gas seal 100 is exposed to the hot gas, the gas inside the gas tight interior space 104 heats up and, as a consequence, expands, and thereby increases the force by which the soft, compliant or flexible surface is pressed against e.g. the walls of heat shield elements. As an alternative, the interior space may as well be filled with a liquid or a solid that either expands or evaporates and increases the force by which the soft, compliant or flexible surface is pressed against e.g. the walls of heat shield elements.

Figure 12:
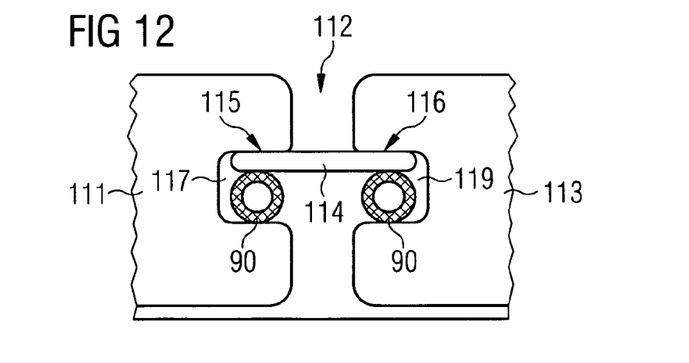
FIG. 12 shows an example of a usage of a hot gas seal according to the fifth embodiment.

An example of the use of a hot gas seal 90, as shown in FIG. 10, or a hot gas seal 100, as shown in FIG. 11, is shown in FIG. 12. FIG. 12 shows a first heat shield element 111 and a second heat shield element 113, which are arranged such that a gap 112 is left there between. In the heat shield elements 111, 113, recesses 117, 119 are formed. A hot gas seal 90, as shown in FIG. 10, or a hot gas seal 100, as shown in FIG. 11, is disposed in each recess 117, 119. In addition, a sealing plate 114 is present, which is partly disposed in the first recess 117 and partly disposed in the second recess 119. The sealing plate 114 is pressed against the upper walls 115, 116 of the recesses 117, 119 by the hot gas seals 90, thus providing good sealing.

Figure 13:
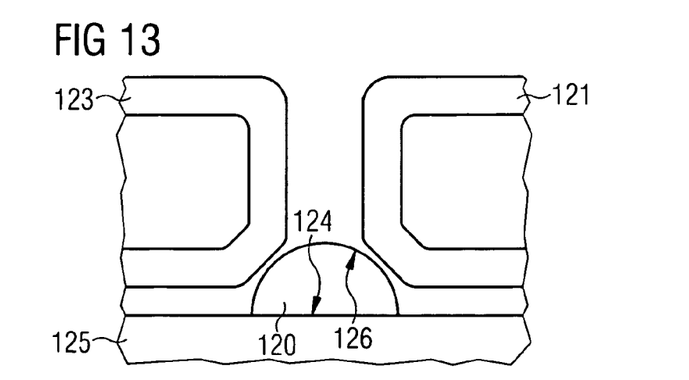
FIG. 13 shows a third example of the fifth embodiment of the inventive hot gas seal.

A third example of the fifth embodiment is shown in FIG. 13. In the present example, the cross section of the hot gas seal 120 resembles a half circle with a flat side 124 and an arcuate side 126. The flat side 124 is pressed against a carrier structure 125 carrying heat shield elements 121, 123 of a heat shield. Inside the hot gas seal 120, either a spring, as in the first example of the fifth embodiment, or a gas filing, as in the second example of the fifth embodiment, may be provided.

Figure 14:
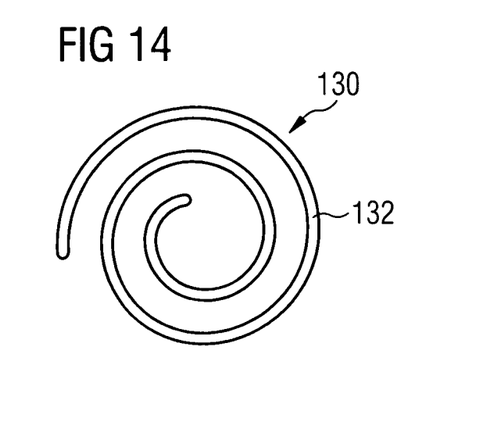
FIG. 14 shows a first example of a sixth embodiment of the inventive hot gas seal.

A first example of the sixth embodiment of the inventive hot gas seal is shown in FIG. 14. The hot gas seal 130 is made from a metal sheet 132 which is rolled up so as to have a spiral cross section. The spiral cross section provides a spring force for providing holding and sealing. The rolled metal sheet 132 may be surrounded by tubular cloth made from metal or ceramics.

Figure 15:
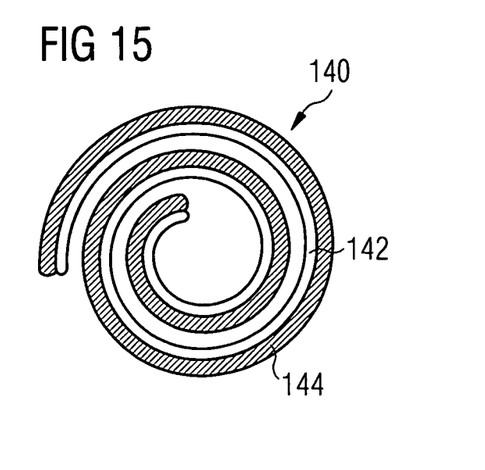
FIG. 15 shows a second example of the sixth embodiment of the inventive hot gas seal.

A second example of the sixth embodiment is shown in FIG. 15. The hot gas seal 140 shown in FIG. 15 is made, like the hot gas seal 130 shown in FIG. 14, from a rolled metal sheet 142 so as to have a spiral cross section. However, the rolled metal sheet 142 is laminated with a soft, compliant or flexible surface 144 made from e.g. TBC, metallic cloth or ceramic cloth. The soft, compliant or flexible surface 144 provides for a better sealing when contacting e.g. the walls of heat shield elements.

Figure 16:
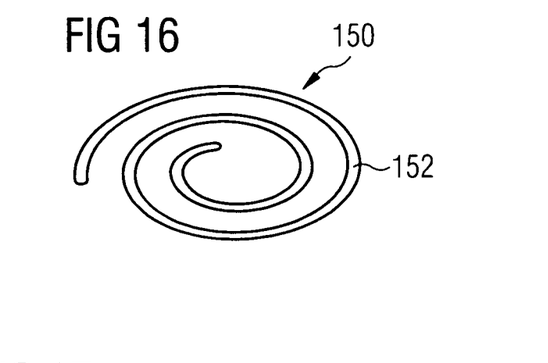
FIG. 16 shows a third example of the sixth embodiment of the inventive hot gas seal.

A third example of the sixth embodiment is shown in FIG. 16. In this example, the spiral cross section of the rolled metal sheet 152 forming the hot gas seal 150 has an elliptic shape to optimize the direction in which the force provided by the rolled up metal sheet 152 is acting.

Figure 17:
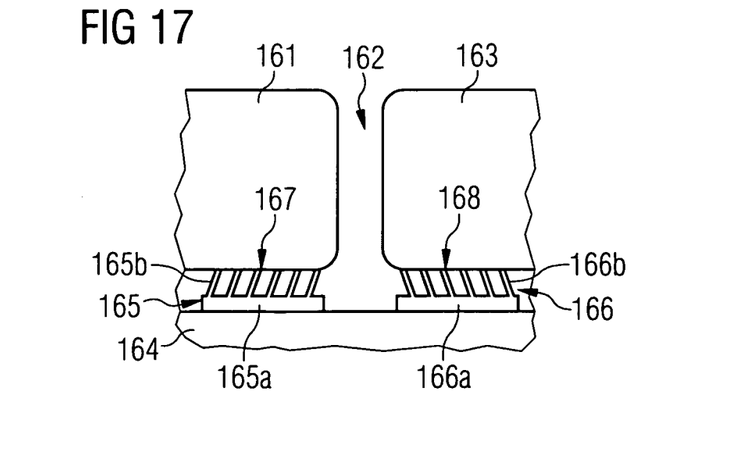
FIG. 17 shows a first example of a seventh embodiment of the inventive hot gas seal.

A first example of the seventh embodiment of the inventive hot gas seal is shown in FIG. 17. The Fig. shows a first heat shield element 161 and a second heat shield element 163. The heat shield elements 161, 163 are fixed to a carrier structure 164 such that a gap 162 is left between them. Between the carrier structure 164 and the heat shield elements 161, 163 hot gas seals 165, 166 are arranged. The seals 165, 166 each comprise a metal plate 165a, 166a which is fixed to the carrier structure 164. Spring loaded metal strips 165b, 166b extend from each metal plate 165a, 166a which is oriented such that the metal strips 165b, 166b project towards the heat shield elements 161, 163. Due to the spring load, the metal strips 165b, 166b are pressed against the lower surfaces 167, 168 of the heat shield elements 161, 163, thereby providing the sealing. A hot gas seal as described with reference the FIG. 17 can have a long sealing length. Further, compared to brush seals, no flow between individual metal strips occurs.

Figure 18:
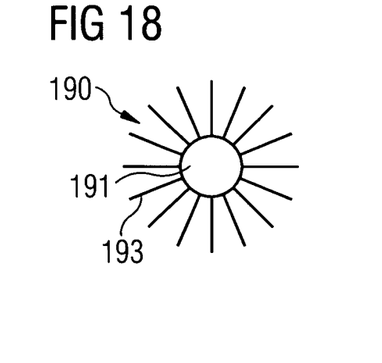
FIG. 18 shows a second example of the seventh embodiment of the inventive hot gas seal.

A second example of the seventh embodiment of the inventive hot gas seal is shown in FIG. 18. The seal 190 shown in FIG. 18 is a so-called brush seal. The brush seal 190 is rope shaped and has a center core 191 which provides support for sealing bristles 193 extending radially from the core 191.

Figure 19:
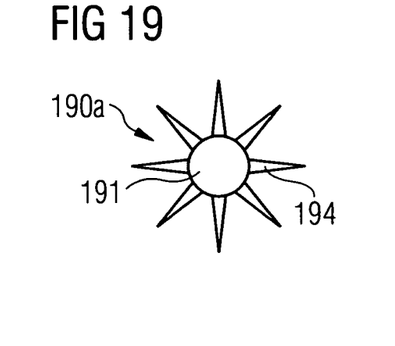
FIG. 19 shows a third example of the seventh embodiment of the inventive hot gas seal.
Figure 20:
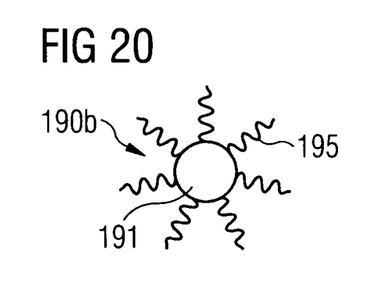
FIG. 20 shows a fourth example of the seventh embodiment of the inventive hot gas seal.
Figure 21:
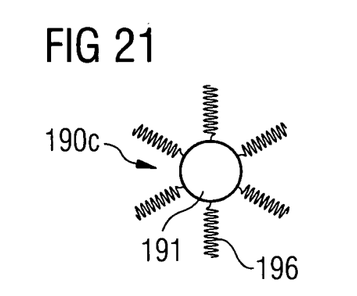
FIG. 21 shows a fifth example of the seventh embodiment of the inventive hot gas seal.

Instead of sealing bristles 193, flexible sealing wedges 194, as in the brush seal 191a shown in FIG. 19, flexible sealing serpentines 195, as in the brush seal 191b shown in FIG. 20, or flexible sealing coils 196, as in the brush seal 191c shown in FIG. 21, may be provided.

Figure 22:
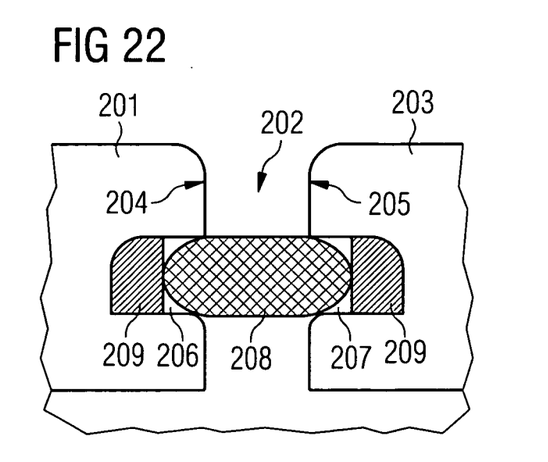
FIG. 22 shows an embodiment of the inventive hot gas seal assembly.

An embodiment of the inventive hot gas seal assembly is shown in FIG. 22. The figure shows a first heat shield element 201 and a second heat shield element 203 which are arranged such that a gap 202 is left between them. In front surfaces 204 205 of the heat shield elements 201, 203, recesses 206, 207 are formed. In the gap 202, a seal 208, which may by e.g. a ceramic seal, a metallic seal, or a cloth seal, is disposed. The seal 208 extends partly into each recess 206, 207. In the inventive sealing assembly, the recesses 206, 207 are partly filled with a solid material 209 which has a melting point lower than the temperature of the hot gas. During installation of the hot gas seal assembly, the solid material 209 is disposed in the recesses 206, 207. When, during operation, the solid material 209 is exposed to the hot gas, it melts and forms a closed join with the seal 208 due to its high viscosity. The melted solid 209 then provides, together with the seal 208, an excellent sealing.

What is claimed is:

1. A hot gas seal for sealing an opening in a heat shield element or between heat shield elements of a heat shield about which a hot gas flows, comprising at least one resilient portion for providing a force with which the hot gas seal can be held is said opening or with which sealing efficiency is increased, wherein:

the hot gas seal includes a tubular sealing body which comprises a resilient core which forms said at least one resilient portion for providing said force; and the resilient core is formed by a space inside of the tubular sealing body which is filled with a liquid or solid that undergoes expansion or evaporation when the hot gas seal is exposed to the hot gas.

2. A hot gas seal for sealing an opening in a heat shield element or between heat shield elements of a heat shield about which a hot gas flows, comprising:

a moveable plate;

a first resilient portion positionable in a first recess in the heat shield element or between the heat shield elements of the heat shield; and a second resilient portion positionable in a second recess in the heat shield element or between the heat shield elements of the heat shield, the first resilient portion and the second resilient portion each positionable against the movable plate, the resilient portions being expandable to provide a force against the plate with which the resilient portions and the plate can be held in said opening or with which the sealing efficiency is increased, wherein each resilient portion includes a tubular sealing body which comprises a resilient core suitable for providing said force, wherein the resilient core is formed by a space inside of the tubular sealing body which is filled with a liquid or solid that undergoes expansion or evaporation when the hot gas seal is exposed to the hot gas.

3. The hot gas seal of claim 1, wherein the resilient portion is positioned in a first recess in the heat shield element or between the heat shield elements of the heat shield, the hot gas seal further comprising:

a moveable plate;

a second resilient portion positionable in a second recess in the heat shield element or between the heat shield elements of the heat shield, and the first resilient portion and the second resilient portion each positionable against the movable plate, the resilient portions being expandable to provide a force against the plate with which the resilient portions and the plate can be held in said opening or with which the sealing efficiency is increased, wherein each resilient portion includes a tubular sealing body which comprises a resilient core suitable for providing said force.

* * * * *